(12) United States Patent  
Kishimoto et al.

(10) Patent No.: US 8,837,119 B2  
(45) Date of Patent: Sep. 16, 2014

(54) MATRIX CONVERTER

(75) Inventors: Kazutaka Kishimoto, Fukuoka (JP); Makoto Kojyo, Fukuoka (JP); Takahiro Uchino, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 461 days.

(21) Appl. No.: 13/187,477

(22) Filed: Jul. 20, 2011

(65) Prior Publication Data

US 2012/0020021 A1   Jan. 26, 2012

(30) Foreign Application Priority Data

Jul. 20, 2010 (JP) ................................. 2010-163131

(51) Int. Cl.
- *H05K 7/20* (2006.01)
- *H02M 7/00* (2006.01)
- *H02M 5/27* (2006.01)

(52) U.S. Cl.
CPC .............. *H02M 7/003* (2013.01); *H02M 5/271* (2013.01)
USPC ...... 361/678; 361/637; 361/648; 361/679.48; 361/821; 361/831; 307/43; 307/126; 363/36

(58) Field of Classification Search
USPC ......... 361/601, 627–629, 631–633, 637–650, 361/676–678, 679.46–679.49, 688–722, 361/752, 796, 831
See application file for complete search history.

(56) References Cited

U.S. PATENT DOCUMENTS

| | | | | | |
|---|---|---|---|---|---|
| 3,443,119 | A | * | 5/1969 | Norton | 307/327 |
| 5,014,181 | A | * | 5/1991 | Anderson et al. | 363/126 |
| 5,731,966 | A | * | 3/1998 | Liu | 363/53 |
| 7,965,508 | B2 | * | 6/2011 | Yamamoto et al. | 361/699 |
| 2003/0070792 | A1 | | 4/2003 | Tanaka et al. | |
| 2009/0301819 | A1 | * | 12/2009 | Agirman et al. | 187/290 |
| 2010/0246217 | A1 | * | 9/2010 | Sakakibara | 363/37 |
| 2010/0296246 | A1 | * | 11/2010 | Kishimoto et al. | 361/695 |
| 2010/0327799 | A1 | * | 12/2010 | Broussard et al. | 318/807 |
| 2011/0132899 | A1 | * | 6/2011 | Shimomugi et al. | 219/620 |

FOREIGN PATENT DOCUMENTS

| | | |
|---|---|---|
| CN | 1366338 | 8/2002 |
| CN | 101534062 | 9/2009 |
| JP | 2006-200860 | 8/2006 |
| JP | 2008-091592 | 4/2008 |
| JP | 2009-077518 | 4/2009 |
| JP | 2010-147131 | 7/2010 |
| JP | 2010-148333 | 7/2010 |

OTHER PUBLICATIONS

Chinese Office Action for corresponding CN Application No. 201110194991.8, Aug. 5, 2013.
Japanese Office Action for corresponding JP Application No. 2010-163131, Dec. 6, 2013.
Japanese Office Action for corresponding JP Application No. 2010-163131, Jul. 4, 2014.

* cited by examiner

*Primary Examiner* — Courtney Smith
(74) *Attorney, Agent, or Firm* — Mori & Ward, LLP

(57) ABSTRACT

A matrix converter includes first to third AC reactors connected in series with first- to third-phase outputs of three-phase AC electric power, and a first cooling fan that generates cool air for cooling the first to third AC reactors. The first to third AC reactors are arranged side-by-side in a direction intersecting a direction in which the cool air flows.

14 Claims, 8 Drawing Sheets

US 8,837,119 B2

MATRIX CONVERTER

CROSS-REFERENCE TO RELATED APPLICATION

The present application claims priority under 35 U.S.C. §119 to Japanese Patent application No. 2010-163131, filed Jul. 20, 2010. The contents of this application are incorporated herein by reference in their entirety.

BACKGROUND OF THE INVENTION

1. Field of the Invention

The embodiments disclosed herein relate to a matrix converter.

2. Discussion of the Background

Japanese Unexamined Patent Application Publication No. 2009-77518, published Apr. 9, 2009, describes a power converter. The power converter has a housing including alternating current (AC) reactors and insulated gate bipolar transistor (IGBT) modules in such a manner that three AC reactors forming an AC filter are provided on the input side of every IGBT module. The housing further includes cooling fans that dissipate the heat generated within the housing to outside.

Every three AC reactors are arranged in order in the direction of the flow of cool air generated by the cooling fans.

SUMMARY OF THE INVENTION

An aspect of the present invention provides a matrix converter includes first, second, and third AC reactors connected in series with first-phase, second-phase, and third-phase outputs of three-phase AC electric power, respectively, and a first cooling fan that generates cool air for cooling the first to third AC reactors. The first to third AC reactors are arranged side-by-side in a direction intersecting a direction in which the cool air flows.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
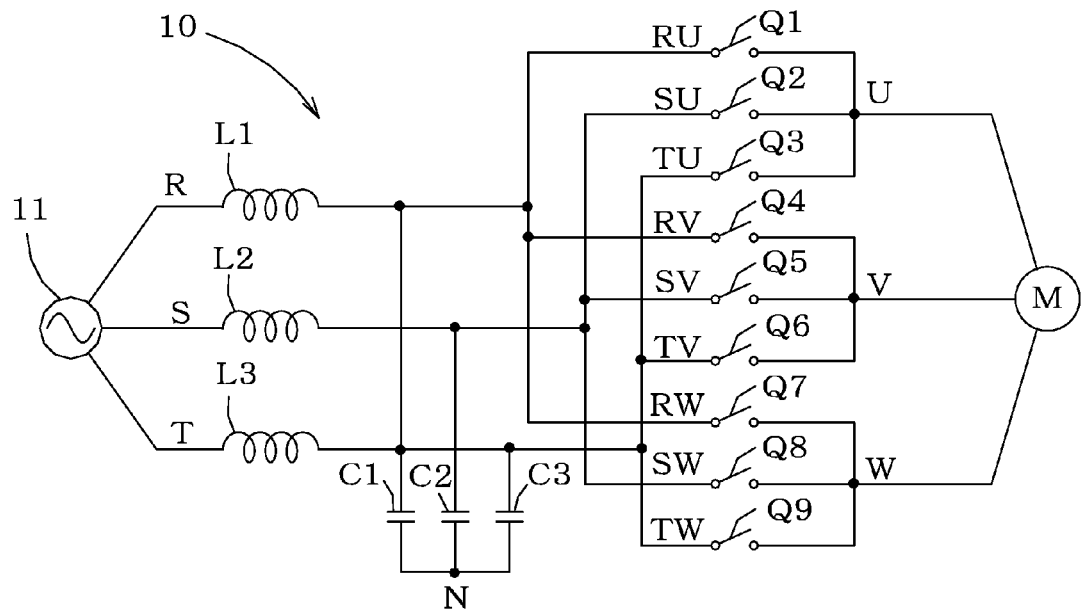
FIG. 1A is an internal connection diagram of a matrix converter according to a first embodiment.

Embodiments will now be described with reference to the accompanying drawings, wherein like reference numerals designate corresponding or identical elements throughout the various drawings.

Exemplary embodiments of the present invention will be described with reference to the accompanying drawings. For convenience of description, an upward direction A, a downward direction B, a leftward direction C, a rightward direction D, a forward direction E, and a rearward direction F illustrated in FIGS. 2 to 8 will be defined. However, matrix converters may be installed in a manner different from that illustrated in the respective figures depending on the actual use of the matrix converters, and, for example, the upward direction illustrated in FIGS. 2 to 8 may be the forward direction, the downward direction may be the rearward direction, the forward direction may be the downward direction, and the rearward direction may be the upward direction. Furthermore, in each figure, portions that are not related to the description may not be illustrated.

A matrix converter 10 according to a first embodiment of the present invention is capable of converting input three-phase AC electric power into AC electric power having a different frequency or voltage. The matrix converter 10 may have a capacity of, for example, 160 kW.

As illustrated in FIG. 1A, the matrix converter 10 includes first, second, and third AC reactors L1, L2, and L3, capacitors C1, C2, and C3, and IGBT modules (examples of a semiconductor switch module) Q1, Q2, Q3, Q4, Q5, Q6, Q7, Q8, and Q9, and is capable of driving a motor M.

The first, second, and third AC reactors L1, L2, and L3 are connected in series with R-phase, S-phase, and T-phase outputs of a three-phase AC power supply 11, respectively.

The capacitors C1, C2, and C3 are Y-connected (star-connected) to the R-phase, S-phase, and T-phase outputs of the first, second, and third AC reactors L1, L2, and L3, respectively. The first, second, and third AC reactors L1, L2, and L3 and the capacitors C1, C2, and C3 form input filters.

In actuality, each of the capacitors C1, C2, and C3 is formed of a plurality of AC capacitors connected in parallel (which are not illustrated in detail in FIG. 1A).

Figure 1B:
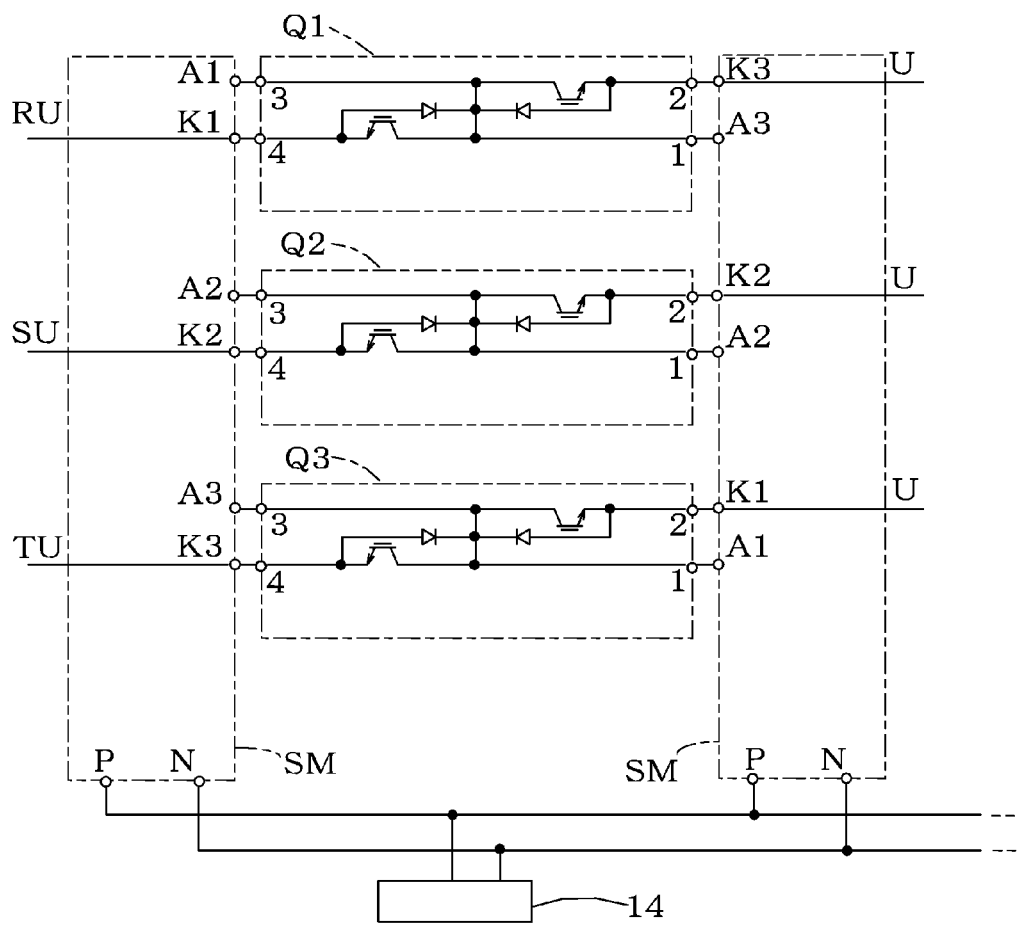
FIG. 1B is a detailed connection diagram of some of IGBT modules illustrated in FIG. 1A.

The IGBT modules Q1, Q2, Q3, Q4, Q5, Q6, Q7, Q8, and Q9 are connected to the output side of the first, second, and third AC reactors L1, L2, and L3. Each of the IGBT modules Q1, Q2, Q3, Q4, Q5, Q6, Q7, Q8, and Q9 includes, for example, a semiconductor bidirectional switch molded with resin, and a peripheral circuit board provided in an upper portion of the IGBT module. The semiconductor bidirectional switches of the IGBT modules Q1, Q2, Q3, Q4, Q5, Q6, Q7, Q8, and Q9 are controlled to be turned on and off by a control circuit (not illustrated), and U-phase, V-phase, and W-phase voltages are output. As illustrated in FIG. 1B, snubber modules SM are connected to the IGBT modules Q1, Q2, Q3, Q4, Q5, Q6, Q7, Q8, and Q9. Each of the snubber modules SM incorporates a plurality of diodes and capacitors which form a snubber circuit for absorbing surge voltage caused by the switching of the corresponding semiconductor bidirectional switch. An external discharge circuit 14 is connected to the snubber modules SM.

As illustrated in FIGS. 2 to 5, a housing 15 of the matrix converter 10 includes first, second, and third AC reactors L1, L2, and L3, a plurality of AC capacitor modules CM11, CM12, CM13, CM21, CM22, CM23, CM31, CM32, and CM33, a plurality of IGBT modules Q1, Q2, Q3, Q4, Q5, Q6, Q7, Q8, and Q9, a plurality of snubber modules SM, and cooling fans 17 and 18 (the cooling fans 17 are examples of a first cooling fan and the cooling fans 18 are examples of a third cooling fan). The first, second, and third AC reactors L1, L2, and L3, the AC capacitor modules CM11, CM12, CM13, CM21, CM22, CM23, CM31, CM32, and CM33, and the IGBT modules Q1, Q2, Q3, Q4, Q5, Q6, Q7, Q8, and Q9 are electrically connected via a copper bar.

A first partition plate (an example of a first fixing member) 21 is located in a rear portion of the housing 15 so as to extend substantially horizontally. A second partition plate (an example of a second fixing member) 22 and a third partition plate (an example of a third fixing member) 23 located to the right of the second partition plate 22 are provided in a portion of the housing 15, other than the rear portion. The first, second, and third partition plates 21, 22, and 23 allow the internal space of the housing 15 to be partially separated into the upper and lower sections. The first and third partition plates 21 and 23 are located at different positions in the upward/downward direction from the second partition plate 22. The first partition plate 21 is provided at a first upward/downward direction position H1 (see FIG. 5). The second partition plate 22 is provided at a second upward/downward direction position H2 that is lower than the first upward/downward direction position H1. The third partition plate 23 is provided at the first upward/downward direction position H1 (see FIG. 6). The third partition plate 23 may be provided at a position different from the first upward/downward direction position H1 if the third partition plate 23 is provided at a position higher than the second upward/downward direction position H2.

A fourth partition plate 24 is further provided (see FIGS. 3 and 6) in a portion of the housing 15, other than the rear portion, so as to extend in the upward direction from a bottom plate 25 of the housing 15 to partially partition the internal space of the housing 15 into right and left sections. The fourth partition plate 24 is coupled to the right end of the second partition plate 22 and the left end of the third partition plate 23.

Next, the cooling fans 17 and 18, the first, second, and third AC reactors L1, L2, and L3, the AC capacitor modules CM11, CM12, CM13, CM21, CM22, CM23, CM31, CM32, and CM33, and the IGBT modules Q1, Q2, Q3, Q4, Q5, Q6, Q7, Q8, and Q9 housed in the housing 15 will be described in detail.

Figure 5:
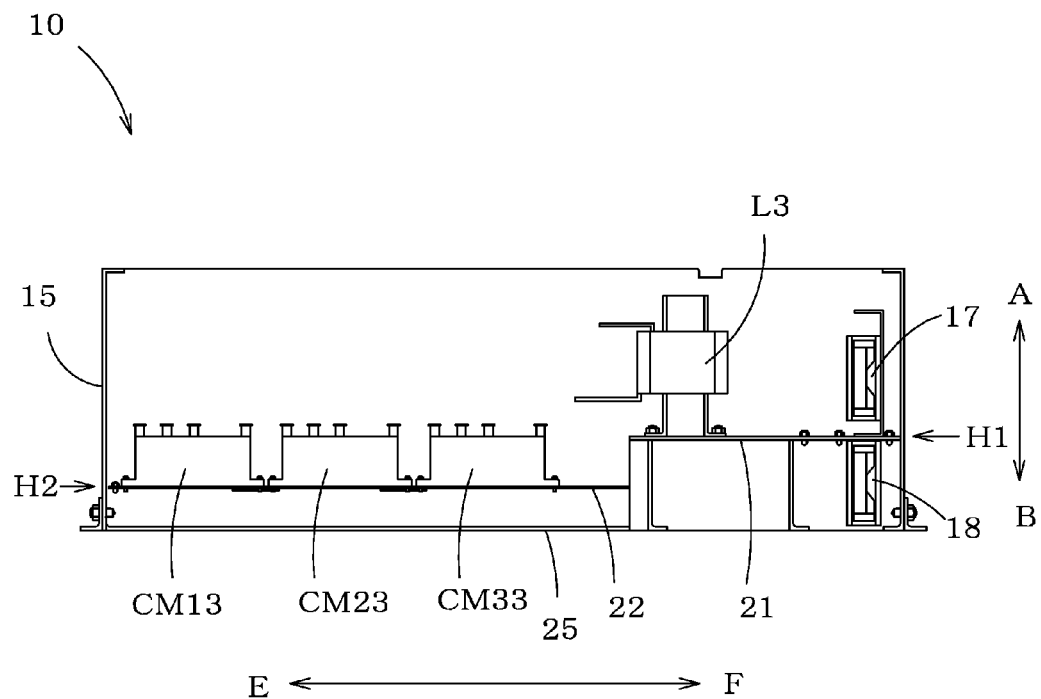
FIG. 5 is a side cross-sectional view illustrating the internal structure of the matrix converter according to the first embodiment.

The cooling fans 17 and 18 are capable of generating cool air for cooling the inside of the housing 15. The generated cool air allows the heat in the housing 15 to be dissipated from the rear of the housing 15. It is noted that heat may be dissipated upward depending on the use of the matrix converter 10. As illustrated in FIG. 5, the cooling fans 17 are arranged on the upper side of the rear end portion of the housing 15, and the cooling fans 18 are arranged below the cooling fans 17.

Figure 4:
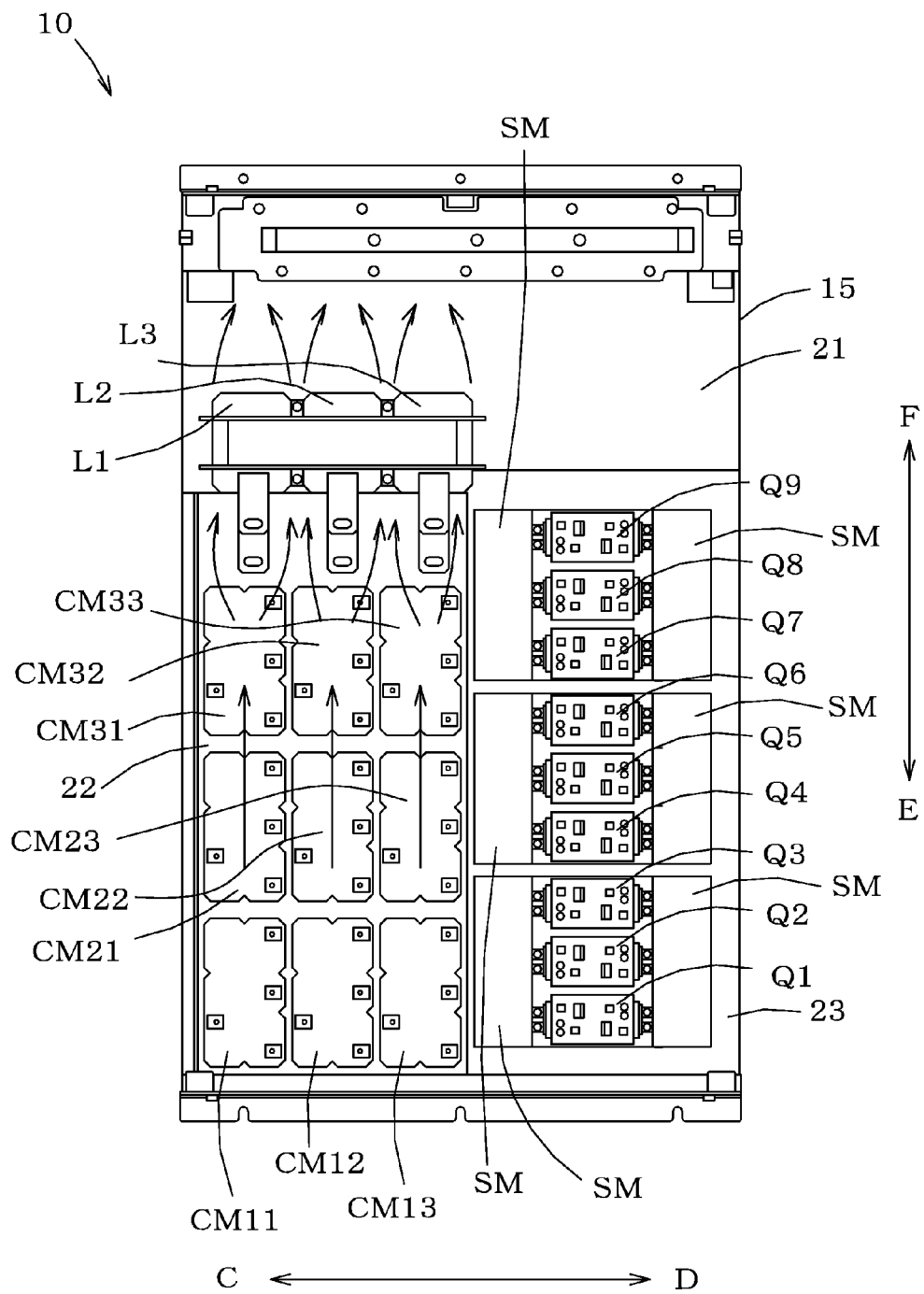
FIG. 4 is a plan view illustrating the internal structure of the matrix converter according to the first embodiment.

The first, second, and third AC reactors L1, L2, and L3 are fixed to the first partition plate 21, and are arranged in a portion near the rear of the housing 15 with respect to the center in the forward/rearward direction. Further, as illustrated in FIG. 4, the first, second, and third AC reactors L1, L2, and L3 are arranged side-by-side in such a direction as to intersect the direction of the flow of the cool air generated by the cooling fans 17 within a range of, for example, 70 to 110 degrees. Accordingly, the cool air substantially equally hits the first, second, and third AC reactors L1, L2, and L3, resulting in satisfactory cooling efficiency being maintained. The direction of the flow of the cool air may intersect the direction in which the first, second, and third AC reactors L1, L2, and L3 are arranged to the extent so as not to select larger AC reactors, which may support a wide temperature range, because of degraded cooling efficiency.

The first, second, and third AC reactors L1, L2, and L3 are integrally formed.

Each of the first, second, and third AC reactors L1, L2, and L3 has a No. 1 terminal and a No. 2 terminal in an upper portion and a lower portion, respectively, so as to project forward (see FIG. 4). Each of the No. 1 terminals and the No. 2 terminals has a hole in the leading end thereof through which the terminal is connected to a copper bar. Copper bars leading to the input side (power supply side) are connected to the No. 1 terminals (input terminals). Copper bars leading to the AC capacitor modules CM11 to CM33 are connected to the No. 2 terminals (output terminals).

Figure 2:
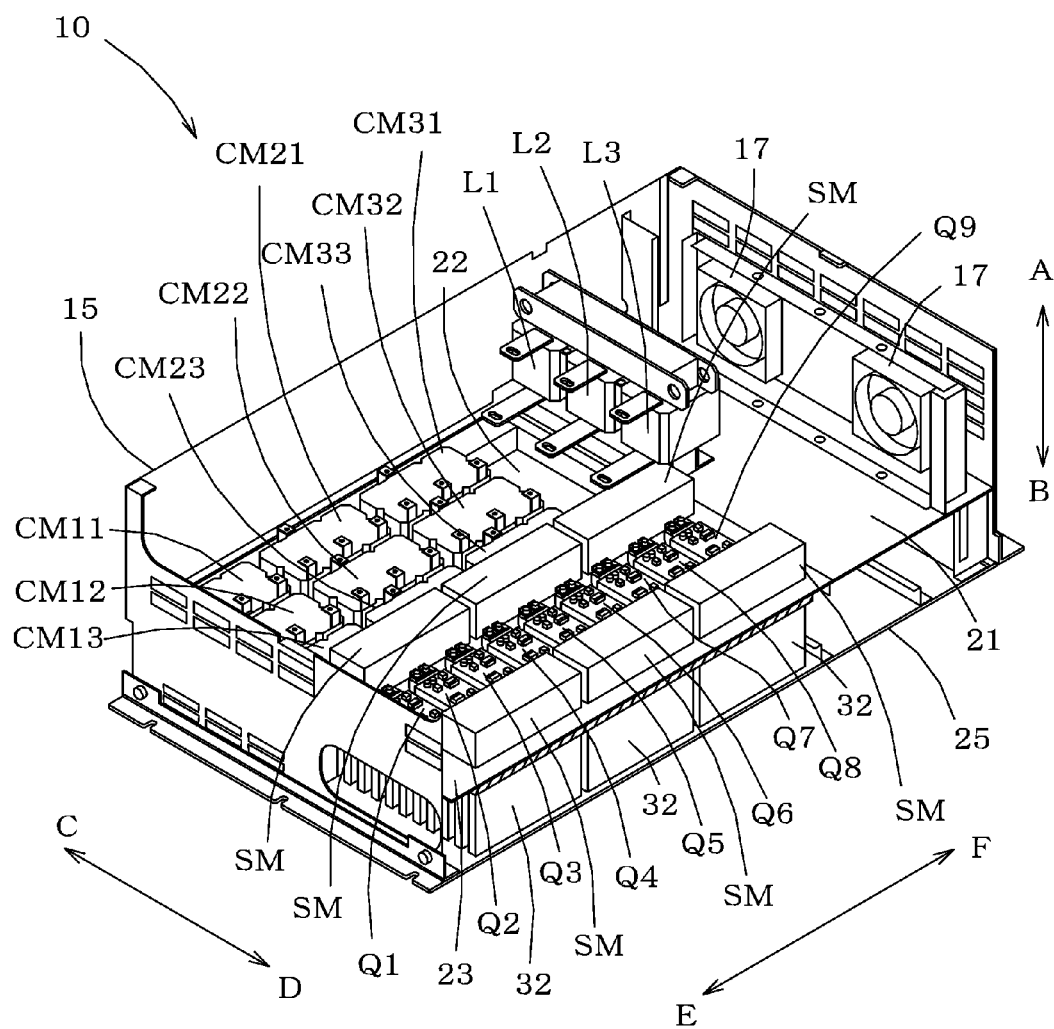
FIG. 2 is a perspective view illustrating the internal structure of the matrix converter according to the first embodiment.
Figure 3:
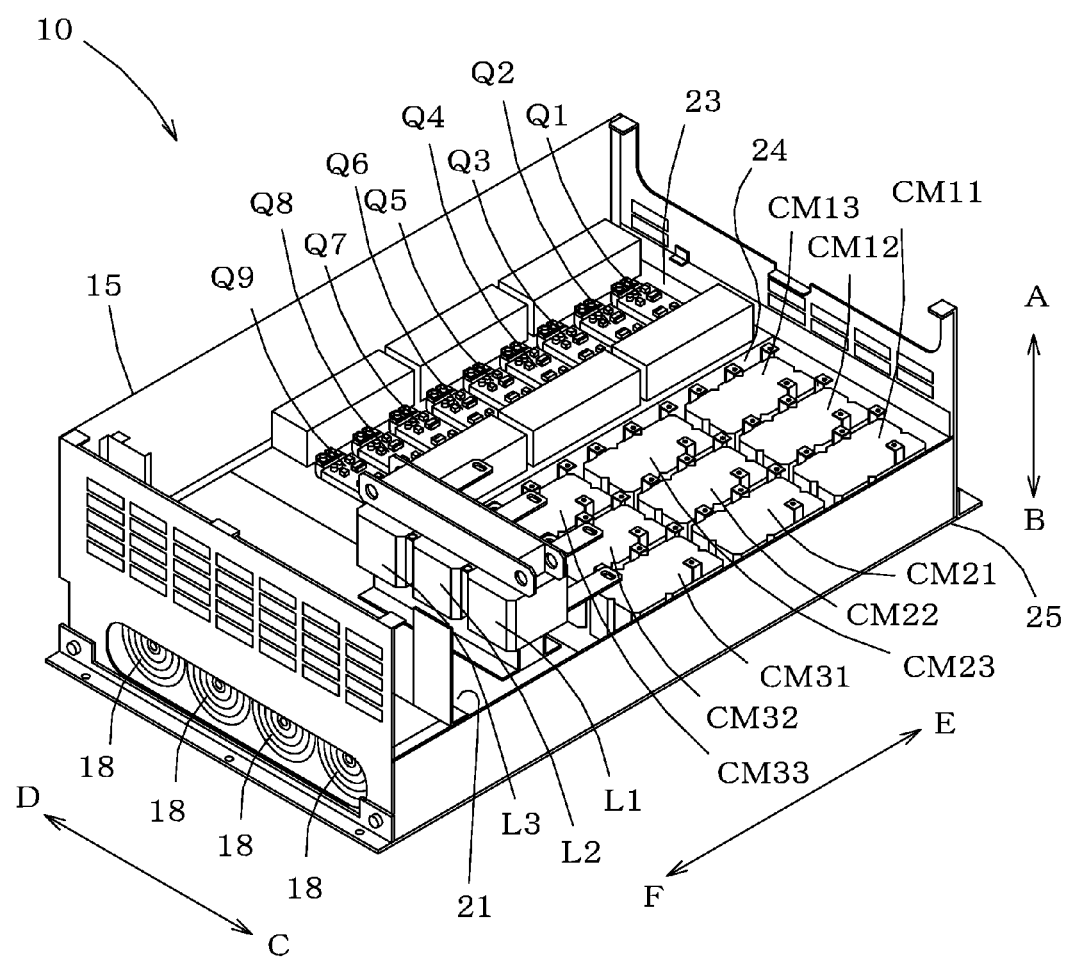
FIG. 3 is a perspective view of an internal portion of the matrix converter according to the first embodiment when viewed from an angle different from that in FIG. 2.

The capacitors C1, C2, and C3 illustrated in FIG. 1A are implemented by, for example, nine AC capacitor modules CM11, CM12, CM13, CM21, CM22, CM23, CM31, CM32, and CM33 as illustrated in FIGS. 2 to 4.

Each of the AC capacitor modules CM11, CM12, CM13, CM21, CM22, CM23, CM31, CM32, and CM33 has, for example, three AC capacitors. In this manner, the capacitors C1, C2, and C3 illustrated in FIG. 1A are separated into the plurality of AC capacitor modules CM11, CM12, CM13, CM21, CM22, CM23, CM31, CM32, and CM33, thus making it easy to change the capacitance of the capacitors C1, C2, and C3. For example, the capacitance of the capacitors C1, C2, and C3 may be reduced by removing the corresponding AC capacitor modules.

The AC capacitor modules CM11, CM12, and CM13 are fixed to the second partition plate 22, and are arranged on the front side of the housing 15. The AC capacitor modules CM21, CM22, and CM23 are fixed to the second partition plate 22, and are arranged behind the AC capacitor modules CM11, CM12, and CM13, respectively. The AC capacitor modules CM31, CM32, and CM33 are fixed to the second partition plate 22, and are arranged behind the AC capacitor modules CM21, CM22, and CM23, respectively. Further, the AC capacitor modules CM31, CM32, and CM33 are arranged in front of the first, second, and third AC reactors L1, L2, and L3, respectively, when viewed in plan.

The AC capacitor modules CM11, CM12, CM13, CM21, CM22, CM23, CM31, CM32, and CM33 are fixed to the second partition plate 22, and are therefore fixed at positions lower than the first, second, and third AC reactors L1, L2, and L3 fixed to the first partition plate 21. Thus, a space is formed in front of the first, second, and third AC reactors L1, L2, and L3 (on the side from which the input and output terminals project) and above the AC capacitor modules CM11, CM12, CM13, CM21, CM22, CM23, CM31, CM32, and CM33.

Each of the AC capacitor modules CM11, CM12, CM13, CM21, CM22, CM23, CM31, CM32, and CM33 has a No. 1 terminal, a No. 2 terminal, a No. 3 terminal, and a No. 4 terminal that project upward (see FIG. 4). Of the four terminals, the No. 1 terminal is provided on the left side, and is connected to a capacitor neutral point N (see FIG. 1A). The No. 2 terminal, the No. 3 terminal, and the No. 4 terminal are provided on the right side, and are connected to the No. 2 terminal (R-phase) of the first AC reactor L1, the No. 2 terminal (S-phase) of the second AC reactor L2, and the No. 2 terminal (T-phase) of the third AC reactor L3, respectively. Three AC capacitors provided in each of the AC capacitor modules CM11, CM12, CM13, CM21, CM22, CM23, CM31, CM32, and CM33 have first terminals internally connected to the No. 1 terminal of the AC capacitor module, and second terminals internally connected to the No. 2 terminal, the No. 3 terminal, and the No. 4 terminal of the AC capacitor module.

A leading end of each of the No. 1 terminal, the No. 2 terminal, the No. 3 terminal, and the No. 4 terminal is bent inward, and has a threaded hole therein through which a copper bar is connected.

The IGBT modules Q1, Q2, Q3, Q4, Q5, Q6, Q7, Q8, and Q9 are fixed to the third partition plate 23, and are arranged side-by-side to the right of the AC capacitor modules CM11, CM12, CM13, CM21, CM22, CM23, CM31, CM32, and CM33 in the forward/rearward direction.

The IGBT modules Q1, Q2, Q3, Q4, Q5, Q6, Q7, Q8, and Q9 are fixed to the third partition plate 23, and are therefore fixed at positions higher than the body portion except for the terminals of the AC capacitor modules CM11, CM12, CM13, CM21, CM22, CM23, CM31, CM32, and CM33 fixed to the second partition plate 22.

Each of the IGBT modules Q1, Q2, Q3, Q4, Q5, Q6, Q7, Q8, and Q9 has a 1 terminal and a No. 2 terminal on the right side thereof, and a No. 3 terminal and a No. 4 terminal on the left side thereof when viewed in plan (see FIG. 4). Each of the No. 1 terminal, the No. 2 terminal, the No. 3 terminal, and the No. 4 terminal is a threaded terminal into which a terminal-fixing screw is inserted from above. Copper bars 29 leading to the load side and the terminals of the snubber modules SM are screwed together with and connected to the No. 2 terminals of the IGBT modules Q1, Q2, Q3, Q4, Q5, Q6, Q7, Q8, and Q9. Copper bars 30 extending from the terminals of the AC capacitor modules CM11, CM12, CM13, CM21, CM22, CM23, CM31, CM32, and CM33, and the terminals of the snubber modules SM are screwed together with and connected to the No. 4 terminals of the IGBT modules Q1, Q2, Q3, Q4, Q5, Q6, Q7, Q8, and Q9. The No. 1 terminals and the No. 3 terminals are connected only to the snubber modules SM1, SM2, SM3, SM4, SM5, and SM6.

Figure 6:
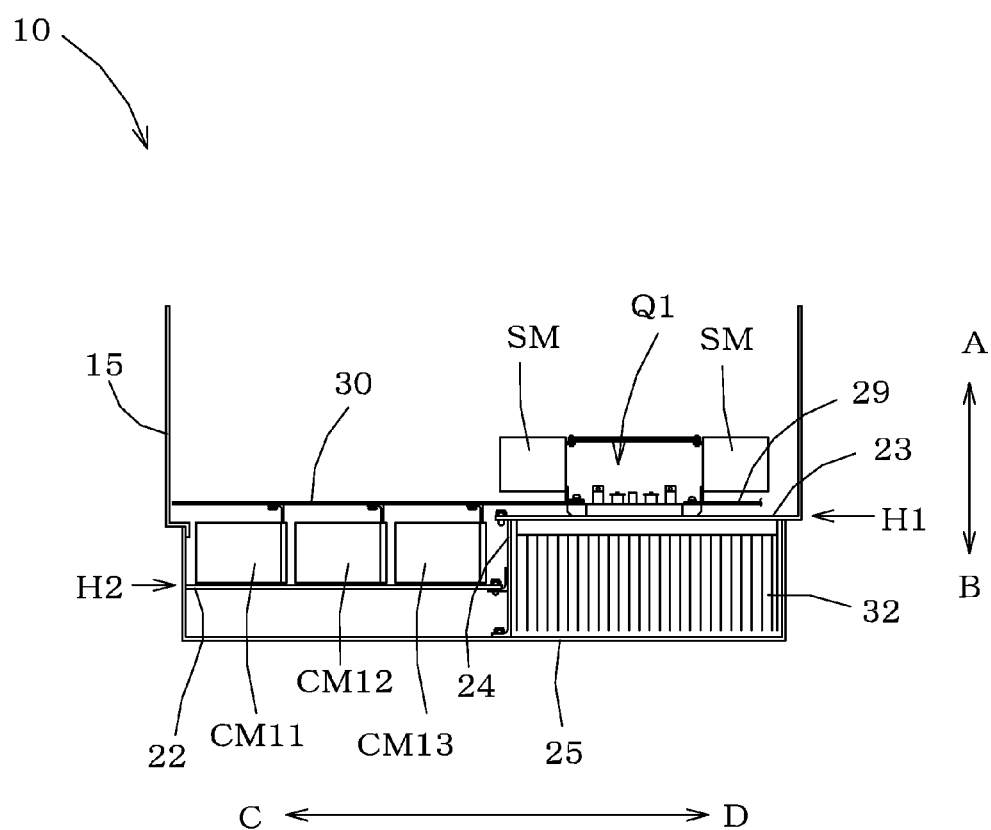
FIG. 6 is a front cross-sectional view illustrating the internal structure of the matrix converter according to the first embodiment.

Here, as described above, the AC capacitor modules CM11, CM12, CM13, CM21, CM22, CM23, CM31, CM32, and CM33 are provided on the second partition plate 22, and the IGBT modules Q1, Q2, Q3, Q4, Q5, Q6, Q7, Q8, and Q9 are provided on the third partition plate 23. Therefore, the leading ends of the terminals of the AC capacitor modules CM11, CM12, CM13, CM21, CM22, CM23, CM31, CM32, and CM33 are substantially at the same height position as the terminals of the IGBT modules Q1, Q2, Q3, Q4, Q5, Q6, Q7, Q8, and Q9 to be connected to the leading ends of the terminals of the AC capacitor modules CM11, CM12, CM13, CM21, CM22, CM23, CM31, CM32, and CM33. Consequently, as illustrated in FIG. 6, the copper bars 30 that connect the terminals of the AC capacitor modules CM11, CM12, CM13, CM21, CM22, CM23, CM31, CM32, and CM33 to the No. 4 terminals of the IGBT modules Q1, Q2, Q3, Q4, Q5, Q6, Q7, Q8, and Q9 are formed linearly when viewed from the front. Since the linear copper bars 30 are not bent in the middle in the thickness direction, inductance is small. Therefore, surge voltage is reduced. The term "substantially at the same height position" means that a shift with which the terminals of the AC capacitor modules can be connected to the terminals of the IGBT modules by using the linear copper bars that are not bent in the middle in the thickness direction is permissible. Therefore, for example, a shift of 5 mm or less is permissible.

Figure 7:
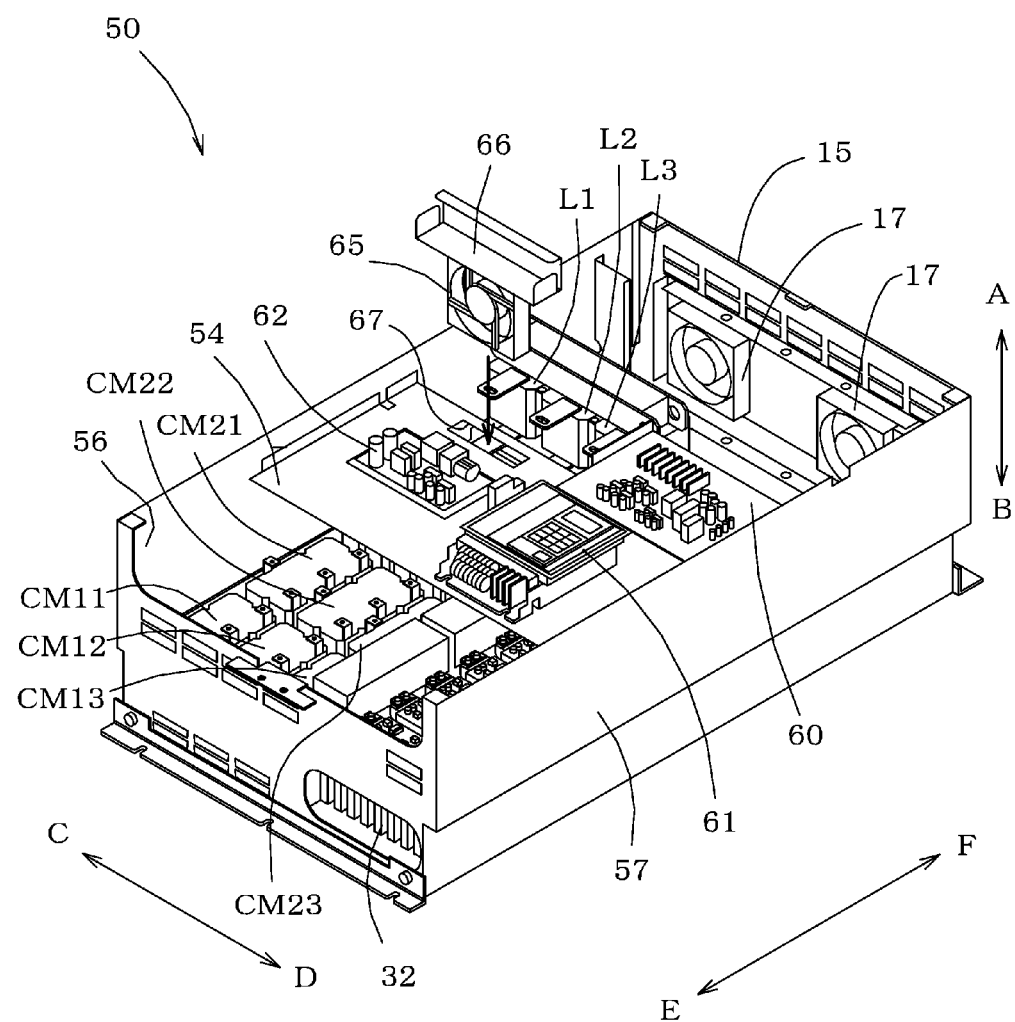
FIG. 7 is a perspective view illustrating installation of a second cooling fan of a matrix converter according to a second embodiment.

Heat sinks 32 are provided on a lower surface of the third partition plate 23 opposite the side on which the IGBT modules Q1, Q2, Q3, Q4, Q5, Q6, Q7, Q8, and Q9 are provided (see FIGS. 2, 6, and 7). The heat sinks 32 allow the heat generated from the IGBT modules Q1, Q2, Q3, Q4, Q5, Q6, Q7, Q8, and Q9 to be dissipated. The heat sinks 32 are cooled mainly by the cooling fans 18.

Subsequently, a matrix converter 50 according to a second embodiment of the present invention will be described. Elements that are the same as or similar to those in the matrix converter 10 according to the first embodiment are assigned the same numerals, and detailed descriptions thereof will be omitted.

First, a mounting plate (an example of a fourth fixing member) 54 illustrated in FIG. 7, which has not been described in the first embodiment, will be described. The mounting plate 54 is provided above the AC capacitor modules CM11, CM12, CM13, CM21, CM22, CM23, CM31, CM32, and CM33 and in a center portion in the forward/rearward direction when viewed in plan. The left and right ends of the mounting plate 54 are fixed to left and right plates 56 and 57 of the housing 15 (facing side plates that define the housing 15), respectively. Therefore, the mounting plate 54 may function as a reinforcing member of the housing 15, resulting in improved rigidity of the housing 15.

The mounting plate 54 has on an upper surface thereof a control circuit board 60 that controls each of the semiconductor bidirectional switches provided in the IGBT modules Q1, Q2, Q3, Q4, Q5, Q6, Q7, Q8, and Q9, an operation unit 61 used by a user to perform various settings of the matrix converter 50, and a power supply board 62 for supplying power supply to the control circuit board 60 and the operation unit 61.

In contrast to the matrix converter 10 according to the first embodiment, the matrix converter 50 further includes a cooling fan (second cooling fan) 65. As described above, the first, second, and third AC reactors L1, L2, and L3 are arranged at different positions in the upward/downward direction from the AC capacitor modules CM11, CM12, CM13, CM21, CM22, CM23, CM31, CM32, and CM33. Thus, a space is formed in front of the first, second, and third AC reactors L1, L2, and L3 (on the side from which the input and output terminals project) and above the AC capacitor modules CM11, CM12, CM13, CM21, CM22, CM23, CM31, CM32, and CM33. The cooling fan 65 is arranged in this space.

Figure 8:
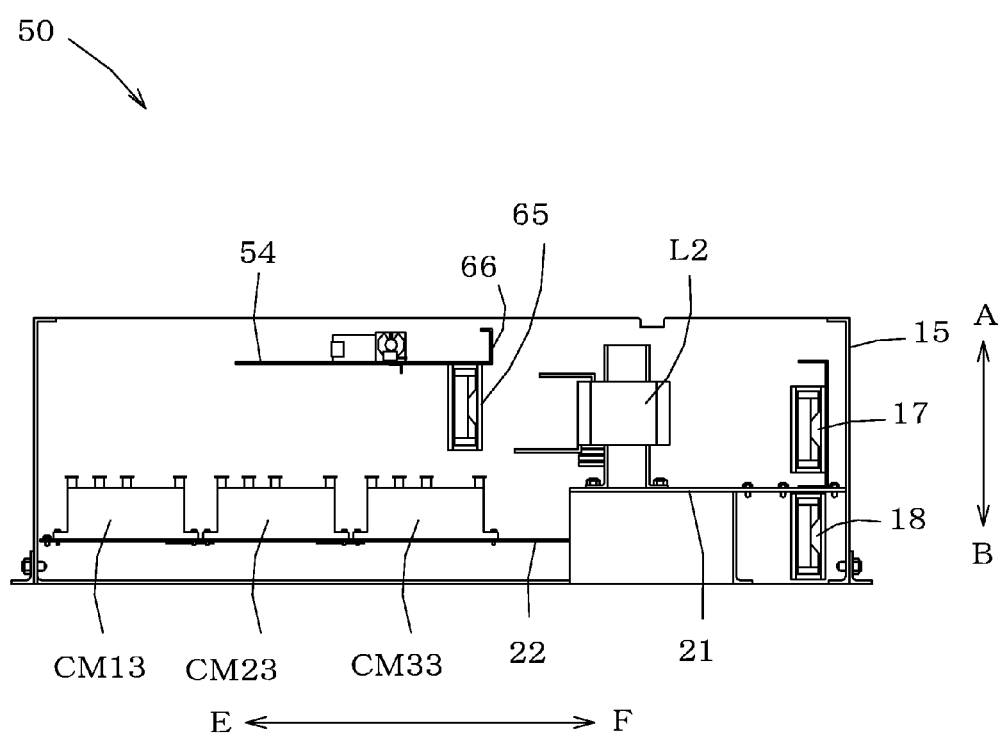
FIG. 8 is a side cross-sectional view illustrating the internal structure of the matrix converter according to the second embodiment.

Specifically, as illustrated in FIG. 8, the cooling fan 65 is supported on the lower side of a supporting member 66, and is fixed to the mounting plate 54 provided in an upper portion of the housing 15 via the supporting member 66. The mounting plate 54 has a rectangular hole 67 therein that is larger than the outer contour of the cooling fan 65. The hole 67 is formed in front of the AC reactor L2 when viewed in plan. The cooling fan 65 is inserted into the hole 67 from above (see the arrow illustrated in FIG. 7), and is fixed to the mounting plate 54 via the supporting member 66.

In this manner, the cooling fan 65 is provided in front of the first, second, and third AC reactors L1, L2, and L3. Therefore, the cooling efficiency of the first, second, and third AC reactors L1, L2, and L3 can further be improved.

It is to be understood that the present invention is not limited to the foregoing embodiments, and various modifications can be made without departing from the scope of the present invention. For example, any combination of the foregoing embodiments and some or all the modifications described above to implement the present invention may also fall within the technical scope of the present invention.

The cooling fans 17 may be arranged at arbitrary positions if cool air can flow in the direction intersecting the direction in which the first, second, and third AC reactors L1, L2, and L3 are arranged.

The capacitors C1, C2, and C3 illustrated in FIG. 1A are configured so as to be separated into nine AC capacitor modules CM11, CM12, CM13, CM21, CM22, CM23, CM31, CM32, and CM33. However, the number of AC capacitor modules is not limited to nine. Further, each of the AC capacitor modules CM11, CM12, CM13, CM21, CM22, CM23, CM31, CM32, and CM33 includes three AC capacitors. However, the number of AC capacitors is not limited to three if. Each of the capacitors C1, C2, and C3 may be formed of a plurality of AC capacitors, and the capacitance may be adjusted by removing any AC capacitor in accordance with specifications.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A matrix converter comprising:
   first, second, and third AC reactors connected in series with first-phase, second-phase, and third-phase outputs of three-phase AC electric power, respectively;
   a first cooling fan that generates cool air for cooling the first to third AC reactors, wherein the first to third AC reactors are arranged side-by-side in a direction intersecting a direction in which the cool air flows; and
   a plurality of AC capacitor modules located on a side from which input and output terminals of the first to third AC reactors project when viewed in plan.

2. The matrix converter according to claim 1, wherein the plurality of AC capacitor modules each have a plurality of AC capacitors, and wherein the plurality of AC capacitors form Y connection on an output side of the first to third AC reactors.

3. The matrix converter according to claim 2, wherein the plurality of AC capacitors modules include nine AC capacitors modules, and wherein the plurality of AC capacitors include three AC capacitors, each of the three AC capacitors having a terminal on a side thereof connected to a neutral point and terminals on another side thereof connected to output terminals of the first to third AC reactors.

4. The matrix converter according to claim 2, wherein the first to third AC reactors and the AC capacitor modules are housed in a housing, and the housing includes a first fixing member on which the first to third AC reactors are fixed, a second fixing member to which the plurality of AC capacitor modules are fixed, and a third fixing member to which a plurality of semiconductor switch modules each having a semiconductor bidirectional switch are fixed, wherein the second fixing member is located at a height position lower than the third fixing member, wherein terminals of the AC capacitor modules are located substantially at the same height position as terminals of the semiconductor switch modules that are connected to the terminals of the AC capacitor modules, and wherein the terminals of the AC capacitor modules are connected to the terminals of the semiconductor switch modules via copper bars that are not bent in a thickness direction.

5. The matrix converter according to claim 4, wherein the second fixing member is located at a height position lower than the first fixing member, and wherein the matrix converter further comprises a second cooling fan that cools the first to third AC reactors, the second cooling fan being arranged in a space formed above the AC capacitor modules and on the side from which the input and output terminals of the first to third AC reactors project.

6. The matrix converter according to claim 5, further comprising:
   a fourth fixing member to which the second cooling fan is fixed, the fourth fixing member being provided above the AC capacitor modules, wherein both ends of the fourth fixing member are fixed to facing side plates that define the housing.

7. The matrix converter according to claim 6, further comprising:
   a supporting member that supports the second cooling fan on a lower side thereof, wherein the second cooling fan is inserted into a hole formed in the fourth fixing member from above, and is fixed to the fourth fixing member via the supporting member.

8. The matrix converter according to claim 3, wherein the first to third AC reactors and the AC capacitor modules are housed in a housing, and the housing includes a first fixing member on which the first to third AC reactors are fixed, a second fixing member to which the plurality of AC capacitor modules are fixed, and a third fixing member to which a plurality of semiconductor switch modules each having a semiconductor bidirectional switch are fixed, wherein the second fixing member is located at a height position lower than the third fixing member, wherein terminals of the AC capacitor modules are located substantially at the same height position as terminals of the semiconductor switch modules that are connected to the terminals of the AC capacitor modules, and wherein the terminals of the AC capacitor modules are connected to the terminals of the semiconductor switch modules via copper bars that are not bent in a thickness direction.

9. The matrix converter according to claim 8, wherein the second fixing member is located at a height position lower than the first fixing member, and wherein the matrix converter further comprises a second cooling fan that cools the first to third AC reactors, the second cooling fan being arranged in a space formed above the AC capacitor modules and on the side from which the input and output terminals of the first to third AC reactors project.

10. The matrix converter according to claim 9, further comprising:
    a fourth fixing member to which the second cooling fan is fixed, the fourth fixing member being provided above the AC capacitor modules, wherein both ends of the fourth fixing member are fixed to facing side plates that define the housing.

11. The matrix converter according to claim 10, further comprising:
    a supporting member that supports the second cooling fan on a lower side thereof, wherein the second cooling fan is inserted into a hole formed in the fourth fixing member from above, and is fixed to the fourth fixing member via the supporting member.

12. The matrix converter according to claim 1, wherein the first to third AC reactors are arranged at a location sandwiched between the first cooling fan and the plurality of AC capacitor modules along the direction in which the cooling air flows.

13. The matrix converter according to claim 1, wherein the direction in which the first to third AC reactors are arranged side-by-side extends substantially perpendicular to the direction in which the cool air flows.

14. The matrix converter according to claim 13, wherein the first to third AC reactors are arranged at a location sandwiched between the first cooling fan and the plurality of AC capacitor modules along the direction in which the cooling air flows.

* * * * *